United States Patent
Mori et al.

(10) Patent No.: US 7,423,524 B2
(45) Date of Patent: Sep. 9, 2008

(54) VISUAL ABILITY IMPROVEMENT SUPPORTING DEVICE

(75) Inventors: Kenichi Mori, Suzuka (JP); Hiroto Nakatani, Nagoya (JP)

(73) Assignee: DENSO CORPORATION, Kariya (JP)

( * ) Notice: Subject to any disclaimer, the term of this patent is extended or adjusted under 35 U.S.C. 154(b) by 224 days.

(21) Appl. No.: 11/253,668

(22) Filed: Oct. 20, 2005

(65) Prior Publication Data

US 2006/0133649 A1   Jun. 22, 2006

(30) Foreign Application Priority Data

Dec. 17, 2004   (JP) .............................. 2004-366692

(51) Int. Cl.
*B60Q 1/00*   (2006.01)
(52) U.S. Cl. ...................... 340/438; 340/439
(58) Field of Classification Search ................. 340/438, 340/425.5, 576
See application file for complete search history.

(56) References Cited

U.S. PATENT DOCUMENTS

| | | | | |
|---|---|---|---|---|
| 5,034,832 | A * | 7/1991 | Sato et al. | 360/94 |
| 6,960,008 | B2 * | 11/2005 | Voelker | 362/541 |
| 6,969,183 | B2 | 11/2005 | Okubo et al. | |
| 7,233,311 | B2 | 6/2007 | Okubo et al. | |
| 7,287,884 | B2 | 10/2007 | Koike | |

FOREIGN PATENT DOCUMENTS

| | | |
|---|---|---|
| JP | A-04-345545 | 12/1992 |
| JP | A-05-238307 | 9/1993 |
| JP | A-2000-203335 | 7/2000 |
| JP | A-2004-185105 | 7/2004 |

OTHER PUBLICATIONS

U.S. Appl. No. 11/183,933, filed Jul. 19, 2005, Ozaki et al.
U.S. Appl. No. 11/189,086, filed Jul. 26, 2005, Nakatani et al.
Hidaka, et al., "Functional stochastic resonance in the human brain; Noise induced sensitization of baroreflex system," *Bionics and Physiology Engineering Symposium*, vol. 15, pp. 261-264.
Office Action mailed Jun. 3, 2008 in corresponding Japanese Patent Application No. 2004-366692 (and English Translation).

* cited by examiner

*Primary Examiner*—George A Bugg
*Assistant Examiner*—Shirley Lu
(74) *Attorney, Agent, or Firm*—Posz Law Group, PLC

(57) ABSTRACT

A visual ability improvement supporting device includes a noise outputting device and a noise generating device. The noise generating device generates noise with intensity which is optimum to a threshold intensity of visibility. The optimum intensity is optimum to induce stochastic resonance (SR). The noise outputting device includes a room lighting device, which illuminates a surrounding area when a lighting switch is turned on, and outputs the visual noise according to the generated noise even when the lighting switch is turned off not to illuminate the surrounding area.

19 Claims, 10 Drawing Sheets

VISUAL ABILITY IMPROVEMENT SUPPORTING DEVICE

CROSS REFERENCE TO RELATED APPLICATION

This application is based on and incorporates herein by reference Japanese patent application No. 2004-366692 filed on Dec. 17, 2004.

FIELD OF THE INVENTION

The present invention relates to a visual ability improvement supporting device.

BACKGROUND OF THE INVENTION

A device for improving visual ability of a human is disclosed in JP-A-2000-203335. The device in the document outputs a light with visible wavelength and an ultraviolet ray toward the frontward of a vehicle. By virtue of the ultraviolet ray, clothes of a passenger become distinctly visible to the driver.

In addition, devices for improving visual ability of a human by utilizing stochastic resonance are described in Japanese patent applications No. 2004-364997 and No. 2004-366489.

The stochastic resonance (SR) in a human brain is discussed in "Functional stochastic resonance in the human brain: Noise induced sensitization of baroreflex system", Hidaka, et al., proceedings of Bionics and Physiology Engineering Symposium, Vol. 15, p. 261-264.

The stochastic resonance in a living body is a phenomenon in which an input of proper noise to a sensory nerve cell enhances its sensitivity to a sub-threshold input signal. It is experimentally shown that the stochastic resonance in a living body enhances vital functions of a human such as perception, regulation and action.

Hereafter, a stochastic resonance is described with reference to FIGS. 10A-10C. FIG. 10A shows a schematic diagram of a sensory nerve cell as a nonlinear system. FIG. 10B shows threshold type input/output characteristics of the system. FIG. 10C shows an output S/N of the system relative to input noise intensity.

As seen in FIG. 10B, the system generally does not respond to an input signal with intensity below a threshold because it has threshold type input/output characteristics. However, if wideband noise is inputted to the system, it responds to some sub-threshold input signals.

In addition, as shown in FIG. 10C, if the wideband noise is too faint or too intensive compared to a threshold irrespective of the intensity of the input signal, the noise decreases the signal-to-noise ratio (S/N) of output signals from the system. With moderate noise intensity the signal-to-noise ratio becomes larger and with the optimum intensity it becomes at its maximum.

SUMMARY OF THE INVENTION

It is an object of the present invention to provide a visual ability improvement supporting device which supports improving the visual ability of a driver in a vehicle.

A visual ability improvement supporting device comprises an illumination for projecting a light with intensity far stronger (e.g., ten times stronger, hundred times stronger, and so on) than a threshold intensity of human's visibility and a noise generating device for generating a noise signal. In addition, the illumination outputs visual noise to a driver of a given vehicle with intensity depending on the intensity of the noise signal. Moreover, the noise generating device generates the noise signal so that the illumination outputs the visual noise with the light intensity near the threshold intensity of human's visibility. Here, the threshold intensity of human's visibility is a border between a visible light intensity range and an invisible light intensity range. A human can recognize a light with intensity in the visible light intensity range and cannot recognize a light with an intensity in the invisible intensity range.

The noise generating device may generate the noise signal so that the illumination outputs the visual noise with the intensity suitable for improving the visual ability of the driver.

BRIEF DESCRIPTION OF THE DRAWINGS

The invention, together with additional objective, features and advantages thereof, will be best understood from the following description, the appended claims and the accompanying drawings in which:

DETAILED DESCRIPTION OF THE INVENTION

Figure 1:
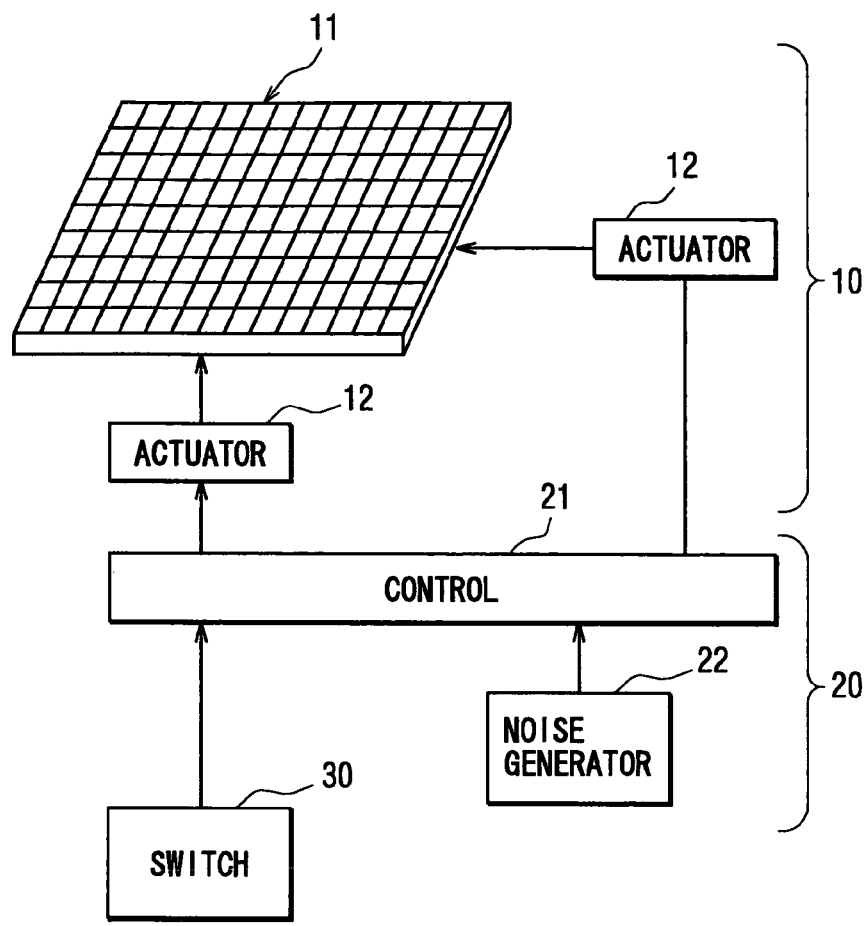
FIG. 1 shows a block diagram of a visual ability improvement supporting device.

According to FIG. 1, a visual ability improvement supporting device of the embodiment is installed in a vehicle (not illustrated) and includes a noise outputting device 10, a noise generating device 20 and a lighting switch (illumination switch) 30. The noise outputting device 10 has a room lighting device 11 of the vehicle and actuators 12. The noise generating device 20 has an electronic control unit 21 and a noise generating unit 22. The Illumination switch 30 is connected with the control unit 21.

The noise generating unit 22 generates noise with the optimum noise intensity in a predetermined manner and outputs the noise to the control unit 21 as an electric noise signal. When the Illumination switch 30 is in an OFF state, the control unit 21 outputs a certain control signal to the actuators 12. The control signal depends on the noise signal from the noise generating unit 22. This control signal is referred to as a noise request signal. When the illumination switch 30 is in an ON state, the control unit 21 outputs a control signal for turning on the lighting device 11 in an ordinal manner to the actuators 12 so that the lighting device 11 emits visible light to illuminate the surrounding area in the conventional manner. This control signal is referred to as an illumination request signal.

Figure 2:
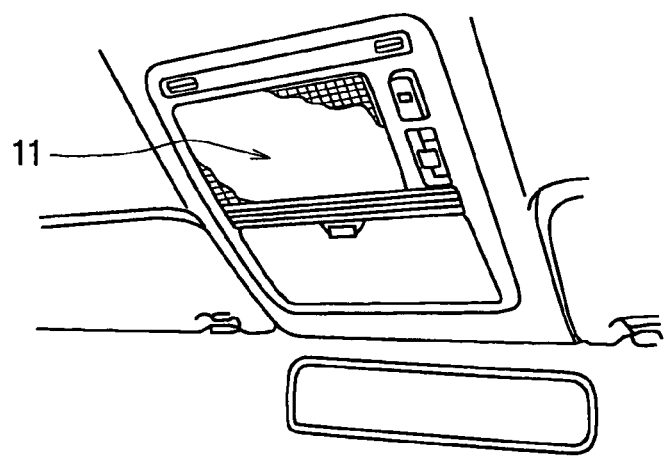
FIG. 2 shows a noise outputting device installed at the bottom of the ceiling of a vehicle.

The room lighting device 11 has a plurality of small light emitting units such as LEDs which are placed in a matrix-like arrangement. Each of the actuators 12 is dedicated to activating the devices in the row direction or the column direction of the matrix. As shown in FIG. 2, the room lighting device 11 is installed at a position which is at the bottom of the ceiling of the passenger compartment and in front of a driver's head. At this position the driver can see the light emitted from room lighting device 11 easily. The room lighting device 11 operates as a noise outputting device.

When the illumination switch 30 is in an OFF state, the actuators 12 makes the room lighting device 11 output light noise (hereafter visual noise) with intensity depending on the noise request signal. When the illumination switch 30 is in an ON state, the actuators 12 make the room lighting device 11 output normal light which is far intensive than the visual noise, according to the illumination request signal.

The visual noise is preferably wideband noise which does not have extremely strong intensity at any frequency range in order to induce stochastic resonance (SR) in visual recognition. For example, random noise having constant intensity at the visible band and 1/f noise having intensity inversely proportional to frequency can be used to induce the stochastic resonance.

The random wideband noise decreases the signal-to-noise ratio (S/N) of output signals from a nonlinear system, if the noise is too intensive or too faint compared to the threshold intensity of visibility. With moderate noise intensity near the threshold, the signal-to-noise ratio becomes larger. With the optimum intensity, the signal-to-noise ratio becomes at its maximum.

To output the visual noise with suitable noise intensity for inducing the stochastic resonance, the noise generating unit 22 may store the optimum noise intensity, which is predetermined for example by experiments, and generate the noise with the stored intensity. The optimum noise intensity may be determined about 100% of the threshold for the random noise and about 69% of the threshold for the 1/f noise. The intensity of the visual noise and the threshold may be measured by the total intensity over their frequency range or a representative intensity (e.g. maximum intensity, mean intensity) of the frequency range.

Otherwise, to compensate differences among individual, the noise generating unit 22 may determine the optimum noise intensity as follows. First, the control unit 21 increases the intensity of light from the room lighting device 11 gradually until the driver recognize the light for the first time. When the driver recognizes the light and subsequently operates a predetermined switch (not illustrated), the control unit 21 detects the operation and makes the noise generating unit 22 store the current light intensity as a threshold intensity of visibility. Then the noise generating unit 22 determines the optimum noise intensity which maximizes the signal-to-noise ratio for the threshold and generates the noise with the stored intensity.

Figure 3:
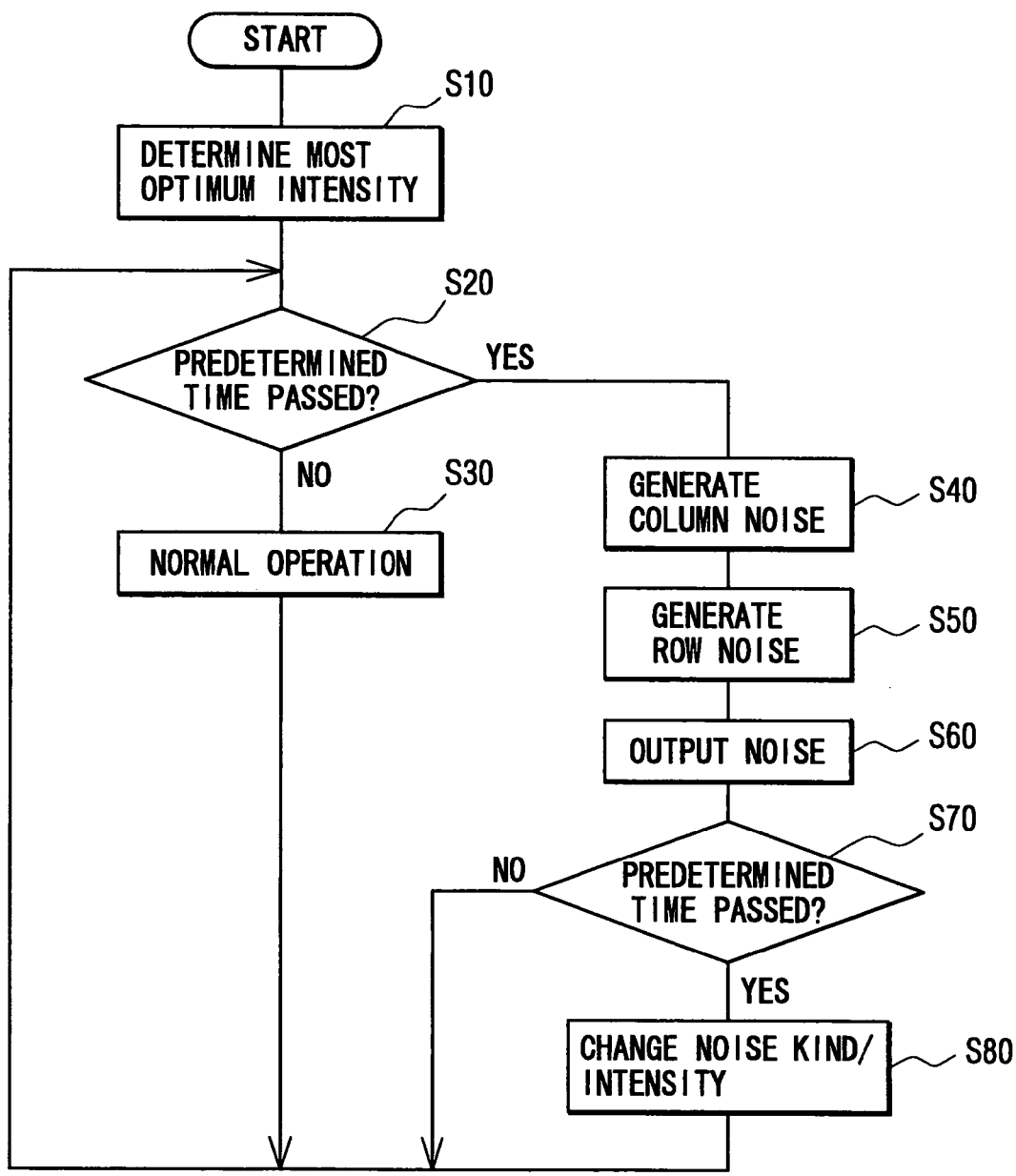
FIG. 3 shows a flowchart of a noise generation process.

The control unit 21 may execute a noise generation process shown in FIG. 3. In the process, the control unit 21 first determines at step S10 the optimum noise intensity as described above.

Next, the unit 21 determines at step S20 whether a first predetermined time passed. In other words, the unit 21 determines whether a counter, which counts time and expires at the every first predetermined time, expired after the last execution of the step S20. If the determination of step S20 is NO (not passed), the unit 21 executes a normal operation of the room lighting device 11. In the normal operation, the unit 21 makes room lighting device 11 output light of normal luminosity to illuminate the room when the illumination switch 30 is turned on, and prohibits the room lighting device 11 from outputting the light for illumination when the illumination switch 30 is tuned off. After step S30, the unit 21 execute step S20 again.

On the other hand, if the determination of step S20 is YES (passed), the unit 21 executes a process for outputting the visual noise as shown in step S40-S80. Specifically, at steps S40, the unit 21 generates noise with the optimum noise intensity according to the noise generating unit 22, along the column direction of the matrix of the lighting device 11. Next at step S50, the unit 21 generates noise with the optimum noise intensity according to the noise generating unit 22, along the row direction of the matrix. Subsequently at step S60, the unit 21 makes the room lighting device 11 output the visual noise. Specifically, the unit 21 outputs the noise request signal generated at steps S40 and S50 to the actuator 12 for the column direction and the actuator 12 for the row direction, respectively. Thus, the room lighting device 11 outputs lights including visual noise.

Subsequently, the unit 21 determines at step S70 whether a second predetermined time passed after the execution of step S10. While the decision is NO (not passed), it executes the step S20 again. On the other hand, when the decision of the step S70 becomes YES (passed), it changes noise kind and/or noise intensity at step S80. The continuous visual noise possibly causes fatigue of the driver and reduces the effect of the stochastic resonance. The change of the noise kind and/or the noise intensity possibly sustains the effect of the stochastic resonance longer. Therefore, the second predetermined time at step S70 is a period after which perception ability of a person changes by fatigue, that is, fatigue time, which can be predetermined by, for example, experiments.

For example, the control unit 21 changes the noise kind by replacing the random noise with the 1/f noise or replacing the 1/f noise with the random noise. The change of the intensity is made within a range of optimum noise intensity. The both ends of the range are, for example, 100±18% of the threshold for the random noise and 69±12% of the threshold for the 1/f noise. In addition, in order to sustain the effect of stochastic resonance longer, the ratio of the change of the intensity may be predetermined by, for example, experiments. Subsequently, the control unit 21 executes the step S20 again.

To be more precise, the process at step S30 may be as follows. If the illumination switch 30 is turned on at step S30, the unit 21 may bypass the step S20 and executes consecutively step S30 until the illumination switch 30 is turned off. In this case, the unit 21 does not execute the process for outputting visual noise of steps S40-S80 while the room lighting device 11 illuminates the room normally.

Thus, the visual ability improvement supporting device improves ability of visual recognition (i.e. visual ability) of the driver by giving the visual noise directly to the driver driving the vehicle. As a result, the driver becomes more sensitive to situations around the vehicle, finds with higher possibility obstacles which have to be recognized in driving, and thus ensures driving safety by reducing the driver's oversight.

The present invention should not be limited to the embodiment discussed above and shown in the figures, but may be implemented in various ways without departing from the spirit of the invention.

Figure 4A:
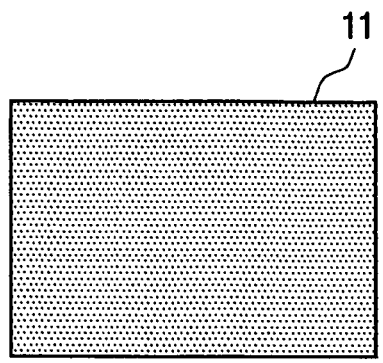
FIG. 4A shows visual noise outputted in a manner that a whole screen blinks.
Figure 4B:
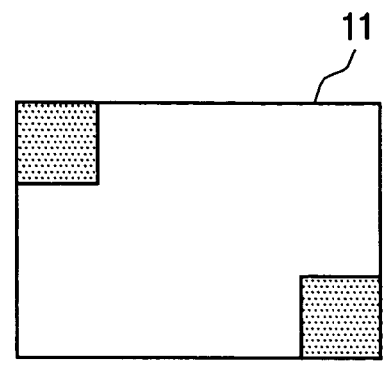
FIG. 4B shows visual noise outputted in a manner that only portions of the screen blink.
Figure 4C:
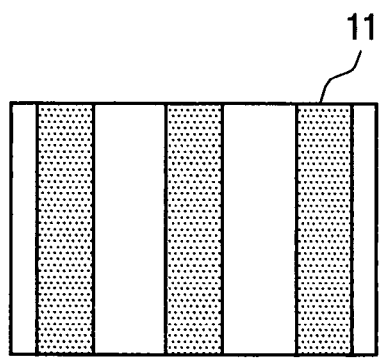
FIG. 4C shows visual noise outputted in a manner that the screen blinks in a stripe pattern.
Figure 4D:
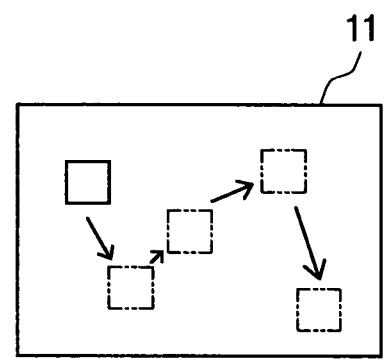
FIG. 4D shows visual noise outputted in a manner that a blinking portion is moving in the screen.
Figure 4E:
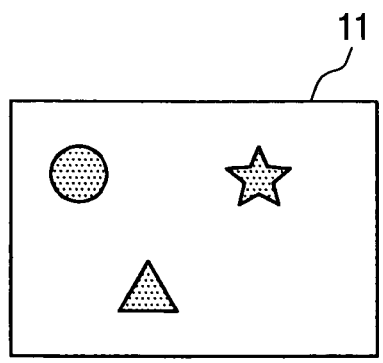
FIG. 4E shows visual noise outputted in a manner that blinking portions have shapes of a circle, a triangle and a star.
Figure 4F:
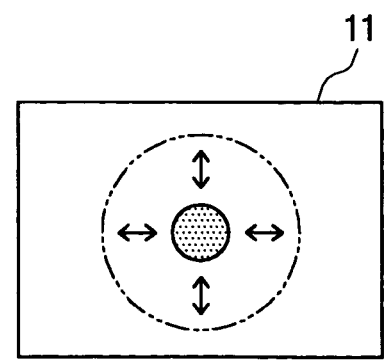
FIG. 4F shows visual noise outputted in a manner that a blinking portion extends and shrinks.

For example, the room lighting device 11 may output the visual noise in various manners. As shown in FIG. 4A, all of the small emitting units in the matrix may blink synchronously. As shown in FIGS. 4B-4F, one or more portion in the matrix may blink synchronously. Specifically, the blinking portion may produce a stripe pattern as shown in FIG. 4C, move randomly as shown in FIG. 4D, have a shape of a circle, a triangle or a star as shown in FIG. 4E and expand and shrink alternately as shown in FIG. 4F.

In addition, the room lighting device 11 may change luminosity, color and duration of the visual noise according to the operation of the control unit 21.

Figure 5:
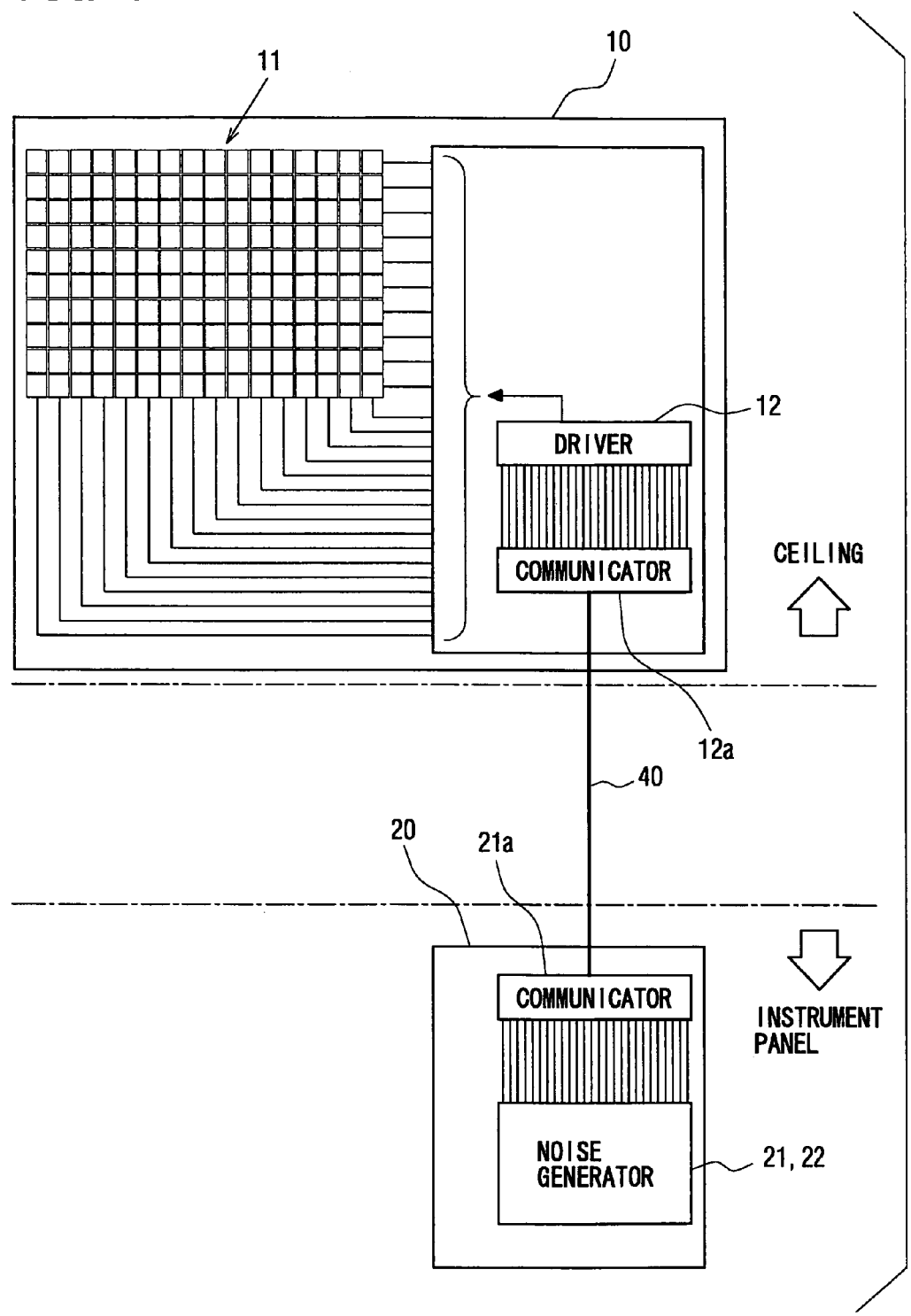
FIG. 5 shows a noise outputting device and a noise generating device which communicate with each other through a serial communications line.

Since the room lighting device 11 in the above embodiment has a plurality of small emitting units, multiple control lines are required to control the units independently. Specifically, the number of the required lines is the number of the rows and columns of the matrix, as shown in FIG. 5. In addition, the room lighting device 11 may be installed in the instrument panel of the vehicle to save a space under the ceiling. In this case, there are some difficulties in wiring many lines between the ceiling and the instrument panel. In this case, as shown in FIG. 5, the noise outputting device 10 in the ceiling may have a communicator 12a and the noise generating device 20 in the instrument panel may have another communicator 21a which communicates with the communicator 12a by serial communications.

Thus, all lines required for the communications between the noise outputting device 10 and the noise generating device 20 is a serial communications line 40, which can be allocated in the pillar. The noise generating device 20 may be installed under a seat or in the trunk of the vehicle.

In addition, the room lighting device 11 at the bottom of the ceiling may be accompanied with a structure for heat radiation, because the room lighting device 11 often outputs the visual noise even if the room is not dark.

Figure 6A:
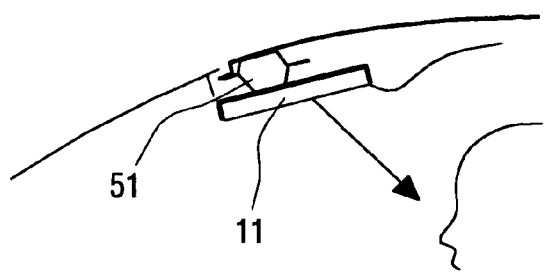
FIG. 6A shows the visual ability improvement supporting device accompanied with a structure for heat radiation.
Figure 6B:
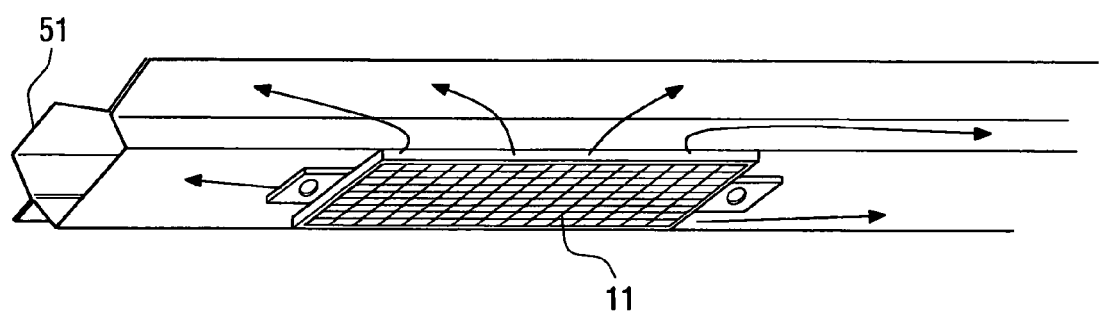
FIG. 6B shows a structure of a heat sink.
Figure 6C:
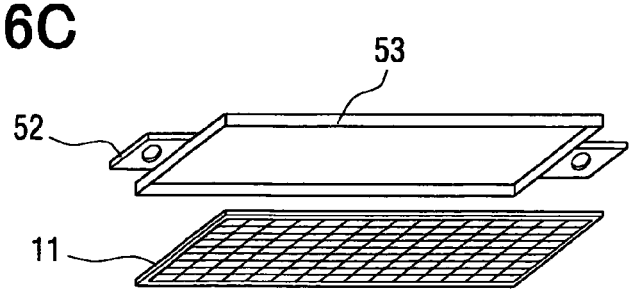
FIG. 6C shows a bracket fixed to the noise generating device.

Then, as shown in FIGS. 6A and 6B, a hollow heat sink 51 which operates as a fixing unit may be fixed to the ceiling and the room lighting device 11 may be fixed to the bottom of the heat sink 51. In this case, as seen in FIG. 6C, a bracket 52 may be fixed to the heat sink 53 and the room lighting device 11 may be fixed to the bracket 52.

In addition, the room lighting device 11 may be replaced by other illuminations such as a projector and a scan type floodlight. The projector changes manners of outputting the visual noise by changing projecting images. The scan type floodlight scans a light source and projects the light by means of a reflecting mirror such as a polygon mirror and changes manners of outputting the visual noise by changing the luminosity of the light source, duration of the light or the scan speed.

Figure 7A:
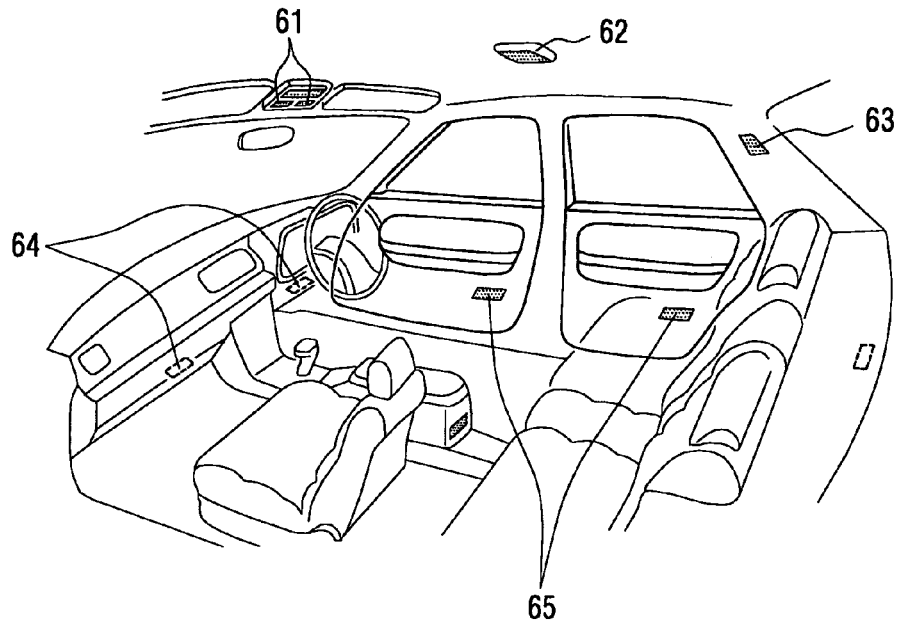
FIG. 7A shows lighting devices in the room of the vehicle.

In addition, the illumination for outputting the visual noise may be installed in the vehicle, as described above, or around the vehicle. For example, as shown in FIG. 7A, map lighting devices 61, a room lighting device 62, a rear personal lighting device 63, foot lighting devices 64 and door courtesy lighting devices 65 may work as the lighting device for outputting visual noise. In this case, the lighting devices in the room surely give the visual noise directly to the driver in the room.

Figure 7B:
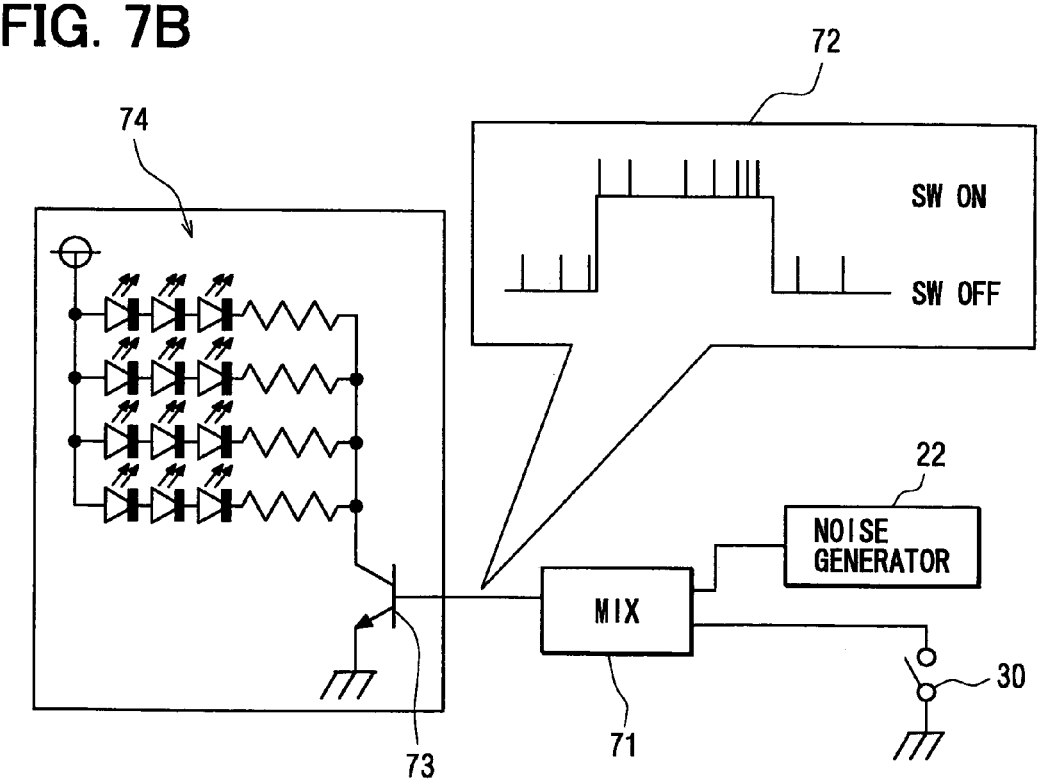
FIG. 7B shows another structure of the visual ability improvement supporting device.

The visual ability improvement supporting device may have a structure as shown in FIG. 7B. In this case, a mixing unit 71 receives a random noise from the noise generating unit 22 and an ON/OFF signal from the illumination switch 30 and mixes them to generate the noise signal 72, which is applied to a transistor 73. Thus, LEDs 74 blink and output the visual noise according to the signal from the transistor 73. In this case, the lighting device 74 can output the visual noise irrespective of the ON/OFF status of the illumination switch 30.

Figure 7C:
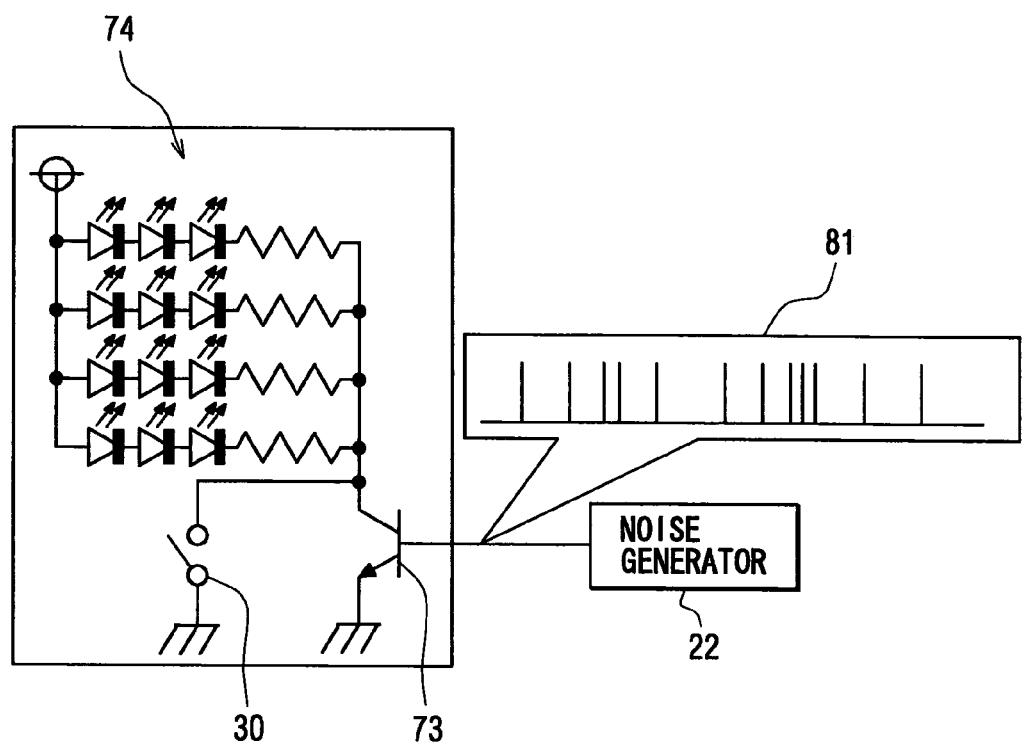
FIG. 7C shows another structure of the visual ability improvement supporting device.

Otherwise, the visual ability improvement supporting device may have a structure as shown in FIG. 7C. In this case, the transistor 73 receives the noise signal from the noise generating unit 22 and outputs the signal. However, the signal reaches the LEDs 74 only if the illumination switch 30 is in the OFF state.

Figure 8A:
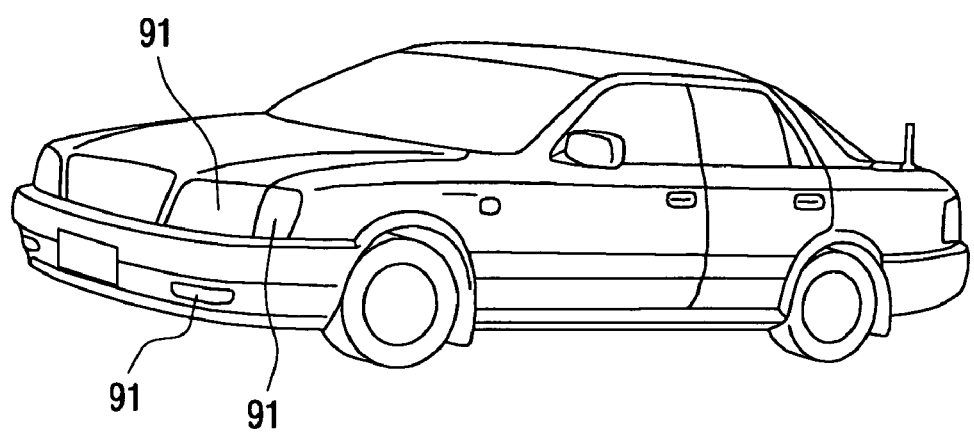
FIG. 8A shows head lighting devices, small lighting devices and turn lighting devices at the front side of the vehicle.
Figure 8B:
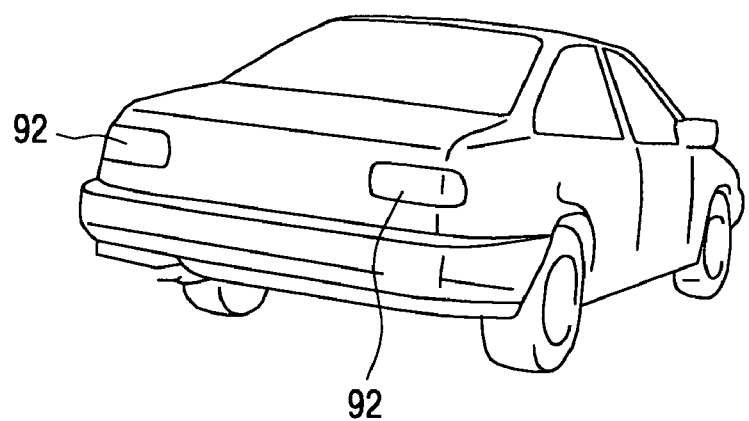
FIG. 8B shows tail lighting devices, stop lighting devices and turn lighting devices at the rear side of the vehicle.

Head lighting devices, small lighting devices and turn lighting devices at the front side of the vehicle shown in FIG. 8A may work as illuminations 91 around the vehicle for outputting the visual noise. Tail lighting devices, stop lighting devices and turn lighting devices at the rear side of the vehicle shown in FIG. 8B may also work as illuminations 92. The illuminations 91, 92 at the outer surface of the vehicle can output the visual noise to a driver in an oncoming vehicle or a following vehicle. Moreover the visual noise from the head lighting devices reflects at rearview mirrors of a leading vehicle and reaches eyes of a driver in the leading vehicle.

Figure 9A:
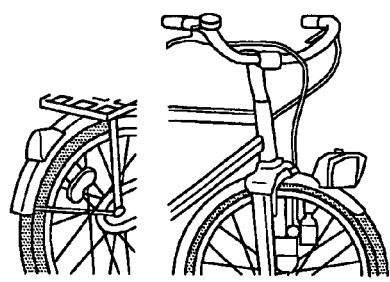
FIG. 9A shows a lighting device installed in a bicycle.
Figure 9B:
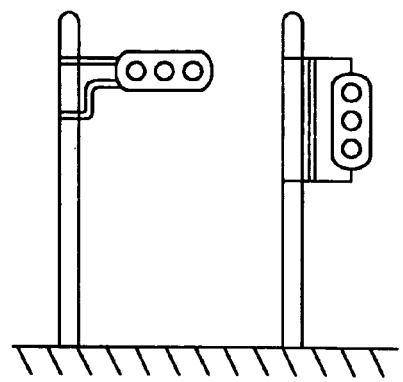
FIG. 9B shows traffic signals.
Figure 9C:
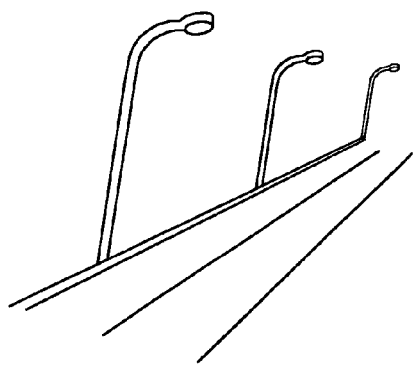
FIG. 9C shows street lighting devices.
Figure 9D:
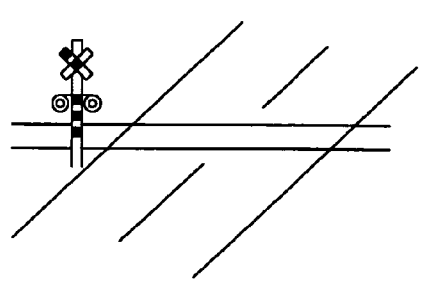
FIG. 9D shows a railroad crossing sign.

The illumination for outputting the visual noise may be installed not only in the automobile, but also in a two-wheeled motor vehicle or a bicycle as shown in FIG. 9A. In addition, lighting devices around a road such as traffic signals, street lighting devices and railroad crossing signs as shown in FIGS. 9B-9D may output the visual noise to a driver in a vehicle moving on the road.

Figure 9E:
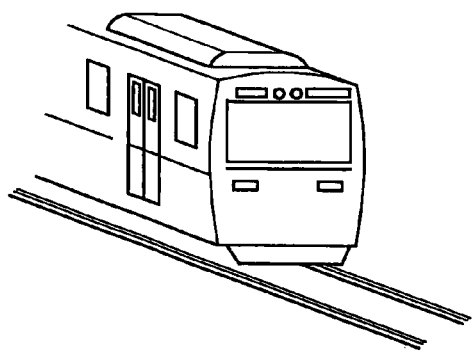
FIG. 9E shows a lighting device in a train.

In addition, lighting devices installed to or accompanying objects moving around a road may output the visual noise to a driver in a vehicle moving on the road. For example, a lighting device accompanying a security guard at a construction field or a foot passenger may output the visual noise. Moreover, a lighting device installed in a train shown in FIG. 9E may output the visual noise. The lighting device in the train is also a lighting device at the outside of a vehicle, because the train is a vehicle.

Figure 9F:
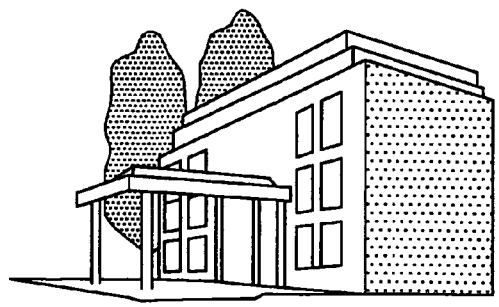
FIG. 9F shows a lighting device in a building.
Figure 10A:
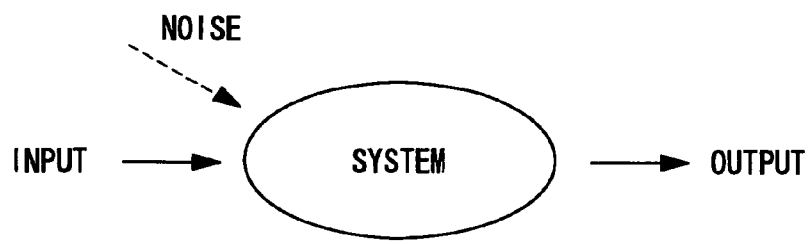
FIG. 10A shows a schematic diagram of a sensory nerve cell as a nonlinear system.
Figure 10B:
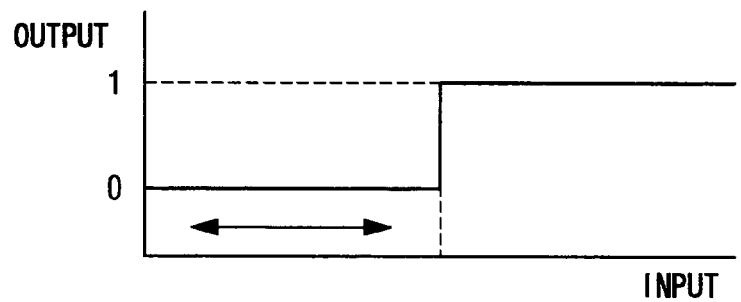
FIG. 10B shows threshold type input/output characteristics of the system.
Figure 10C:
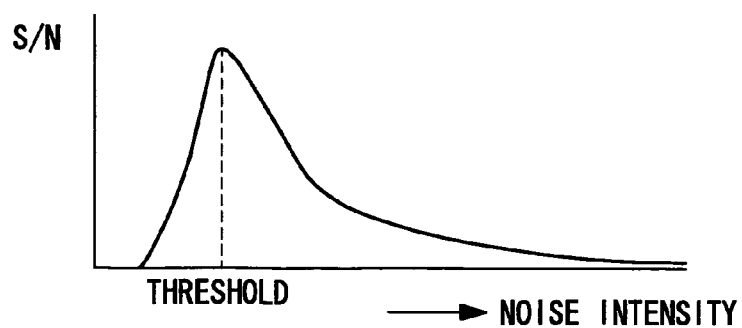
FIG. 10C shows an S/N-noise intensity of the system.

In addition, lighting devices on the outside of a building shown in FIG. 9F which is constructed along a road may output the visual noise to a driver in a vehicle moving on the road.

In addition, the control unit 21 may execute the process for outputting visual noise of steps S40-S80 and the normal operation of step S30 alternately, wherein the each execution lasts a third predetermined time. However, if the third predetermined time is too long, it sometimes take a long time until the room lighting device 11 illuminates the room after the driver turns on the illumination switch 30. This will give the driver uncomfortable feeling. Therefore, it is preferable to set the third predetermined time at step S20 to a sufficiently short time which will not give the driver such uncomfortable feeling.

In addition, the intensity of the visual noise may be predetermined according to the expected distance between the driver and the illumination for outputting the visual noise, so that the illuminance of the visual noise at the eyes of the driver becomes around (preferably below) the threshold of visibility.

What is claimed is:

1. A visual ability improvement supporting device comprising:
    an illumination device for projecting a light with intensity far stronger than a threshold intensity of human visibility, wherein a human can recognize a light with an intensity stronger than the threshold intensity and cannot recognize a light with an intensity fainter than the threshold intensity; and
    a noise generating device for generating a wideband noise signal,
    wherein the illumination device outputs visual noise to a driver of a given vehicle with an output intensity corresponding to a noise intensity of the wideband noise signal by mixing the visual noise with the light of an intensity stronger than the threshold intensity of human visibility to induce stochastic resonance and visual recognition, and
    wherein the wideband noise signal is set to cause the output intensity to be near the threshold intensity of human visibility.

2. The visual ability improvement supporting device according to claim 1, wherein the illumination is installed in the given vehicle at a position from which the human normally receives no direct light from the illumination.

3. The visual ability improvement supporting device according to claim 1, wherein the illumination is installed at an outer surface of another vehicle and outputs the visual noise to the driver of the given vehicle.

4. The visual ability improvement supporting device according to claim 1, wherein the illumination is placed around a road and outputs the visual noise to the driver of the given vehicle moving on the road.

5. The visual ability improvement supporting device according to claim 1, wherein the illumination is installed in or accompanying an object moving around a road and outputs the visual noise to the driver of the given vehicle moving on the road.

6. The visual ability improvement supporting device according to claim 1, wherein the illumination changes manners of outputting the visual noise.

7. The visual ability improvement supporting device according to claim 6, wherein the illumination has a plurality of emitting units and changes manners of outputting the visual noise by changing at least one of luminosity of the emitting units, color of the emitting units, duration of the emission of the emitting units and selection of an emitting unit to use among the emitting units.

8. The visual ability improvement supporting device according to claim 2, wherein:
    the noise generating device is installed below a head of the driver at a driver's seat of the given vehicle;
    the illumination device is installed at the ceiling of the given vehicle and in front of the driver; and
    the noise generating device is connected to the illumination through a serial communications line.

9. The visual ability improvement supporting device according to claim 6, wherein the illumination is a projector which changes manners of outputting the visual noise by changing images to be projected.

10. The visual ability improvement supporting device according to claim 6, wherein the illumination is a lighting device which scans a light source and projects the light and changes manners of outputting the visual noise by changing luminosity of the light source, duration of the light or speed of the scan.

11. The visual ability improvement supporting device according to claim 6, wherein the illumination switches, according to a use's operation, between projecting the light with intensity far stronger than the threshold intensity of human's visibility and outputting the visual noise to the driver.

12. A visual ability improvement supporting device comprising:
    a noise generating device for generating an electric wideband noise signal corresponding to a threshold intensity of human visibility, wherein a human can recognize a light with an intensity stronger than the threshold intensity and cannot recognize a light with an intensity fainter than the threshold intensity;
    a noise outputting device for outputting visual noise according to the wideband noise signal to a driver of a vehicle, so that the visual noise improves the visual ability of the driver;
    switch means for generating a switch signal when turned on; and
    circuit means for driving the noise outputting device in response to the wideband noise signal and the switch signal,
    wherein the noise outputting device includes a lighting device of the vehicle, the lighting device outputting the light of the intensity stronger than the threshold intensity in response to the switch signal and outputting the visual noise in response to the wideband noise signal by mixing the visual noise with the light of the intensity stronger than the threshold intensity to induce stochastic resonance and visual recognition.

13. The visual ability improvement supporting device according to claim 12, wherein the lighting device includes a light provided at a fore side of the driver in the vehicle to provide the light to be viewed by the driver.

14. The visual ability improvement supporting device according to claim 12, wherein the lighting device outputs the visual noise only in response to the noise signal when no switch signal is generated by the switch means.

15. The visual ability improvement supporting device according to claim 12, further comprising mixing means for mixing the switch signal and the noise signal to generate a mixing signal, and for driving the lighting device in response to the mixing signal.

16. A visual ability improvement supporting device comprising:
    a noise generating device for generating a wideband noise signal;
    a light-emitting device for projecting a light emission including a first light portion and a second light portion, which are mixed to induce stochastic resonance and visual recognition,
    wherein the first light portion has an intensity stronger than a threshold of human visual perception, the threshold of human visual perception being a light intensity value below which light is not perceptible to a human,
    wherein the second light portion comprises visual noise having a power level set by the wideband noise signal, and wherein the wideband noise signal is set to cause the visual noise to have intensity near the threshold of human visual perception.

17. The visual ability improvement supporting device according to claim 1, wherein the visual noise is wideband noise and comprises one of: random noise having substantially constant intensity at the visible band, and 1/f noise having intensity inversely proportional to frequency.

18. The visual ability improvement supporting device according to claim 12, wherein the visual noise is wideband noise and comprises one of: random noise having substantially constant intensity at the visible band, and 1/f noise having intensity inversely proportional to frequency.

19. The visual ability improvement supporting device according to claim 15, wherein the visual noise is wideband noise and comprises one of: random noise having substantially constant intensity at the visible band, and 1/f noise having intensity inversely proportional to frequency.

* * * * *